(12) United States Patent
Kouketsu

(10) Patent No.: US 12,531,424 B2
(45) Date of Patent: Jan. 20, 2026

(54) POWER CONVERSION DEVICE

(71) Applicant: DENSO CORPORATION, Kariya (JP)

(72) Inventor: Kaoru Kouketsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 830 days.

(21) Appl. No.: 17/733,278

(22) Filed: Apr. 29, 2022

(65) Prior Publication Data

US 2022/0263335 A1 Aug. 18, 2022

Related U.S. Application Data

(63) Continuation of application No. PCT/JP2020/040003, filed on Oct. 23, 2020.

(30) Foreign Application Priority Data

Oct. 30, 2019 (JP) ................. 2019-197375

(51) Int. Cl.
*H02J 7/06* (2006.01)
*H02J 7/00* (2006.01)
*H02J 7/34* (2006.01)
*H02M 1/00* (2007.01)
*H02M 1/12* (2006.01)
(Continued)

(52) U.S. Cl.
CPC .............. *H02J 7/06* (2013.01); *H02J 7/0013* (2013.01); *H02J 7/342* (2020.01); *H02M 1/0067* (2021.05); *H02M 1/123* (2021.05); *H02M 1/126* (2013.01); *H02M 3/33573* (2021.05); *H02M 7/06* (2013.01); *H02J 2207/20* (2020.01)

(58) Field of Classification Search
CPC .................................................. H02J 2207/20
See application file for complete search history.

(56) References Cited

U.S. PATENT DOCUMENTS

2012/0229061 A1* 9/2012 Itoh ..................... H02M 3/1584
318/400.3
2013/0093394 A1* 4/2013 Iyasu ....................... H02J 7/04
320/109

(Continued)

FOREIGN PATENT DOCUMENTS

JP 2016-220345 A 12/2016
JP 2018-083510 A 5/2018
(Continued)

OTHER PUBLICATIONS

Dec. 1, 2020 International Search Report issued in International Patent Application No. PCT/JP2020/040003.

*Primary Examiner* — Tynese V McDaniel
(74) *Attorney, Agent, or Firm* — Oliff PLC

(57) ABSTRACT

A power conversion device is applicable to a power supply system including a first battery and a second battery having a rated voltage different from a rated voltage of the first battery. The power conversion device includes a charging circuit configured to convert AC power input from an AC power supply into DC power and charge the first battery with the DC power, a voltage converter configured to convert a power supply voltage of the first battery and outputs the converted voltage to the second battery, and an interrupting unit configured to be capable of interrupting a supply of the DC power to the voltage converter during charging of the first battery by the charging circuit.

11 Claims, 10 Drawing Sheets

(51) Int. Cl.
*H02M 3/335* (2006.01)
*H02M 7/06* (2006.01)

(56) References Cited

U.S. PATENT DOCUMENTS

2018/0301983 A1* 10/2018 Okazaki .................. B60L 53/20
2019/0115848 A1   4/2019 Okazaki et al.
2019/0312499 A1* 10/2019 Ha ........................... H02J 7/02

FOREIGN PATENT DOCUMENTS

JP      2018133946 A  *  8/2018
WO     WO-2011141785 A1 * 11/2011   .......... B60L 11/1812

* cited by examiner

POWER CONVERSION DEVICE

CROSS-REFERENCE TO RELATED APPLICATION

The present application is a continuation application of International Application No. PCT/JP2020/040003, filed on Oct. 23, 2020, which claims priority to Japanese Patent Application No. 2019-197375, filed on Oct. 30, 2019. The contents of these applications are incorporated herein by reference in their entirety.

BACKGROUND

Technical Field

The present disclosure relates to a power conversion device.

Background Art

Conventional power conversion devices are known that include a charging circuit that converts AC power supplied from an external commercial power supply or the like into DC power and charges a battery with the DC power, and a voltage converter that converts a power supply voltage of the battery to a voltage and outputs the voltage to an in-vehicle auxiliary device or the like. In the power conversion devices, the voltage converter is connected to an electrical path that connects the charging circuit to the battery.

SUMMARY

In the present disclosure, provided is a power conversion device as the following.

The power conversion device includes a charging circuit configured to convert AC power input from an AC power supply into DC power and charges a first battery with the DC power, a voltage converter configured to convert a power supply voltage of the first battery and output the converted voltage to a second battery, and an interrupting unit configured to be capable of interrupting a supply of the DC power to the voltage converter during charging of the first battery by the charging circuit.

BRIEF DESCRIPTION OF THE DRAWINGS

The above object and other objects, features, and advantages of the present disclosure will become more apparent from the following detailed description with reference to the accompanying drawings. In the drawings.

DETAILED DESCRIPTION OF THE PREFERRED EMBODIMENTS

[PTL 1] JP 2016-220345 A

Figure 1:
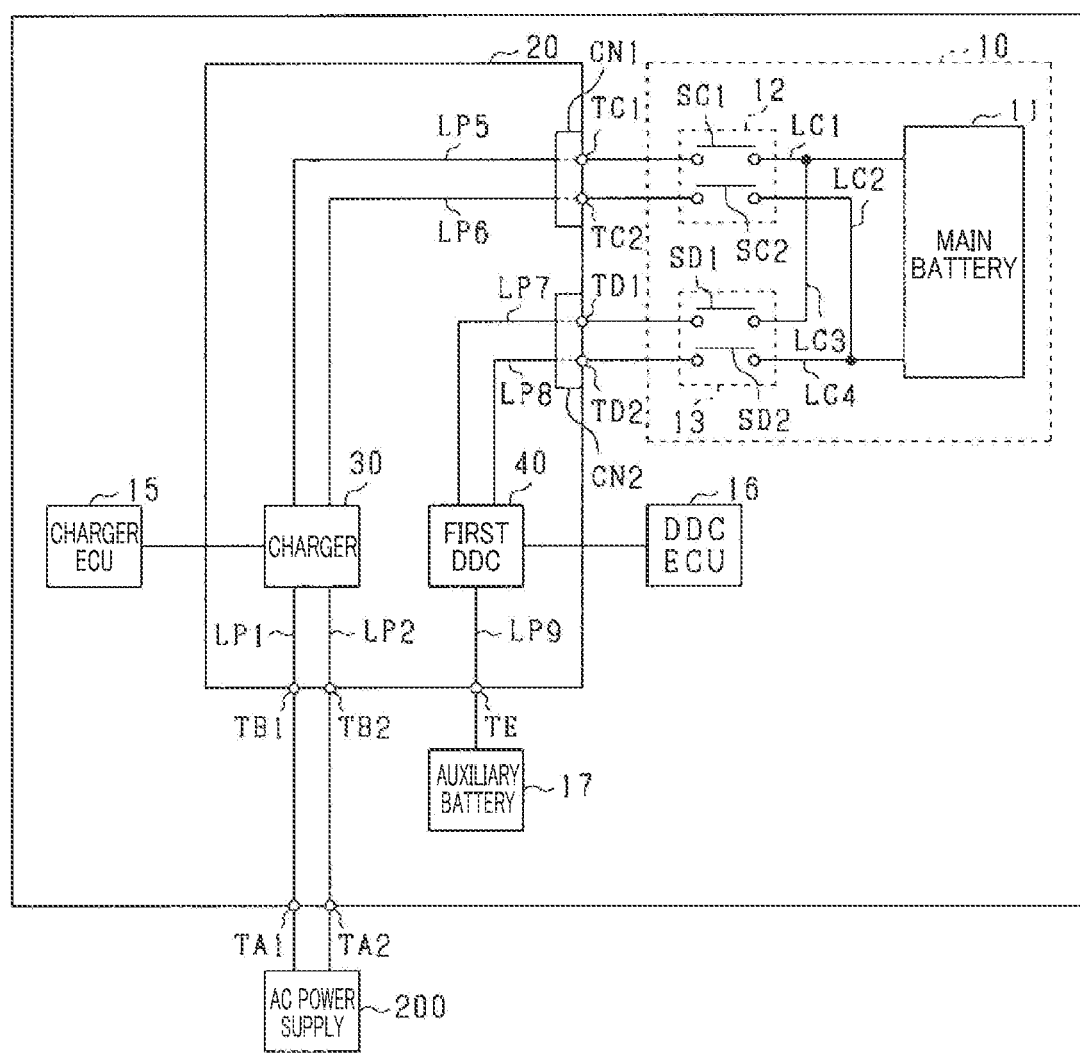
FIG. 1 is a configuration diagram of a power supply system according to a first embodiment.

In the case where the charging circuit and the voltage converter are connected to the electrical path shared by the charging circuit and the voltage converter, when the battery is charged by the charging circuit, part of the DC power generated by the charging circuit is supplied to the voltage converter. If the supply of the DC power to the voltage converter causes the voltage applied to the voltage converter to increase and exceed a threshold, a control unit that controls the voltage converter is started, leading to an increase in power consumed in the voltage converter. The in-vehicle auxiliary device or the like is less likely to be used during charging of the battery; thus, there is no need for the control unit to be started. The start of the control unit causes unnecessary power consumption in the voltage converter, resulting in a problem such as a longer charging time for the battery.

The present disclosure has been made in view of the above circumstances, and an object of the present disclosure is to provide a power conversion device capable of achieving lower power consumption in a voltage converter during charging of a battery.

A first configuration for solving the above problem is a power conversion device that is applicable to a power supply system including a first battery and a second battery having a rated voltage different from a rated voltage of the first battery. The power conversion device includes a charging circuit configured to convert AC power input from an AC power supply into DC power and charges the first battery with the DC power, a voltage converter configured to convert a power supply voltage of the first battery and output the converted voltage to the second battery, and an interrupting unit configured to be capable of interrupting a supply of the DC power to the voltage converter during charging of the first battery by the charging circuit.

In the above configuration, the charging circuit configured to convert the AC power input from the AC power supply into DC power and charges the first battery with the DC power and the voltage converter configured to convert the power supply voltage of the first battery and output the converted voltage to the second battery are both connected to the first battery. Furthermore, the interrupting unit is capable of interrupting the supply of the DC power from the charging circuit to the voltage converter during charging of the first battery by the charging circuit. This prevents an increase in the voltage applied to the voltage converter, thus preventing the start of a control unit that controls the voltage converter. This makes it possible to achieve lower power consumption in the voltage converter during charging of the first battery.

In a second configuration, the interrupting unit includes a charging-side connector connecting the charging circuit to the first battery, and a voltage-conversion-side connector provided separately from the charging-side connector and connecting the voltage converter to the first battery.

In the above configuration, the charging-side connector connecting the charging circuit to the first battery is provided separately from the voltage-conversion-side connector connecting the voltage converter to the first battery. Thus, in the power conversion device, a charging path connecting the charging circuit to the first battery can be separated from a voltage conversion path connecting the voltage converter to the first battery, making it possible to interrupt the power supply between the charging circuit and the voltage converter.

In a third configuration, the power conversion device includes a charging path connecting the charging circuit to the first battery, and a voltage conversion path connecting the voltage converter to the first battery, the interrupting unit includes a switch unit provided at a portion of the voltage conversion path closer to the voltage converter than a connection point between the charging path and the voltage conversion path is.

In the above configuration, the charging path connecting the charging circuit to the first battery is connected at the connection point to the voltage conversion path connecting the voltage converter to the first battery. Thus, the charging circuit and the voltage converter can be connected to the first battery using a connector shared by the charging circuit and the voltage converter. Furthermore, the switch unit is provided at a portion of the voltage conversion path closer to the voltage converter than the connection point is. Thus, by causing the switch unit to be in an OFF state during charging of the first battery, it is possible to prevent the supply of the DC power from the charging circuit to the voltage converter.

In a fourth configuration, the switch unit is a first switch unit, and the interrupting unit includes a second switch unit provided at a portion of the charging path closer to the charging circuit than the connection point is.

When the power supply voltage of the first battery is applied to the charging circuit during conversion performed by the voltage converter, a control unit that controls the charging circuit may be started, leading to unnecessary power consumption in the charging circuit. In the above configuration, the first switch unit is provided at a portion of the voltage conversion path closer to the voltage converter than the connection point is, and the second switch unit is provided at a portion of the charging path closer to the charging circuit than the connection point is. Thus, by causing the second switch unit to be in the OFF state during conversion performed by the voltage converter, the application of the power supply voltage of the first battery to the charging circuit is prevented. This makes it possible to achieve lower power consumption in the charging circuit during conversion performed by the voltage converter.

In a fifth configuration, the second battery has a lower rated voltage than the first battery, the voltage converter is a first voltage converter that steps down the power supply voltage and outputs the stepped-down voltage to the second battery, the charging circuit includes a power conversion circuit that converts AC power input from the AC power supply into DC power, and a second voltage converter that converts a conversion voltage output from the power conversion circuit and outputs the converted voltage to the first battery, and the power conversion device further includes a third voltage converter, the third voltage converter is connected between a portion of the power conversion circuit and a portion of the first voltage converter, the portion of the power conversion circuit being connected to the second voltage converter, the portion of the first voltage converter being connected to the second battery, and steps down the conversion voltage and outputs the stepped-down voltage to the second battery, and the third voltage converter includes a primary-side circuit connected to the power conversion circuit, a secondary-side circuit connected to the first voltage converter, and an isolation transformer that connects the primary-side circuit to the secondary-side circuit.

In the above configuration, the charging circuit includes the power conversion circuit and the second voltage converter, and the third voltage converter is connected between a portion of the power conversion circuit and a portion of the first voltage converter, the portion of the power conversion circuit being connected to the second voltage converter, the portion of the first voltage converter being connected to the second battery. Thus, by using the third voltage converter, it is possible to charge the second battery using the AC power input from the AC power supply, without driving the first voltage converter.

On the other hand, the charging circuit is connected to the first voltage converter by the third voltage converter. In this configuration, the third voltage converter is configured such that the primary-side circuit connected to the power conversion circuit is connected via the isolation transformer to the secondary-side circuit connected to the first voltage converter. Thus, even though the third voltage converter is provided, insulation is secured between the charging circuit and the first voltage converter. Furthermore, the third voltage converter and the first voltage converter are both step-down circuits, and the output sides, i.e., the low-voltage sides, of these step-down circuits are connected to each other. Thus, even when the voltage obtained by stepping down the conversion voltage in the third voltage converter is applied to the output side of the first voltage converter, the control unit that controls the first voltage converter is not started, making it possible to achieve lower power consumption in the voltage converter during charging of the first battery.

In a sixth configuration, the first voltage converter and the third voltage converter are connected to the second battery via a filter circuit shared by the first voltage converter and the third voltage converter.

In the above configuration, the filter circuit is shared by the first voltage converter and the third voltage converter, and thus the configuration of the power conversion device can be simplified.

In a seventh configuration, the filter circuit is provided in the first voltage converter, and the filter circuit includes a first filter circuit, and a second filter circuit that is provided at a position closer to the second battery than the first filter circuit is and that has a higher cutoff frequency than the first filter circuit, the first voltage converter has a higher rated output current than the third voltage converter, and the third voltage converter is connected to the second battery via the first filter circuit and the second filter circuit that are provided in the first voltage converter.

Conversion performed by the voltage converter causes voltage variation, and thus in some cases, a plurality of filter circuits are used to reduce noise caused by the voltage variation. For example, the first filter circuit having a low cutoff frequency is used to remove relatively large noise, and the second filter circuit having a high cutoff frequency is used to remove relatively small noise that cannot be removed by the first filter circuit.

In the above configuration, the first voltage converter has a higher rated output current than the third voltage converter; thus, the filter circuit of the first voltage converter having a high rated output current is shared by the first voltage converter and the third voltage converter. In this case, by sharing not only the first filter circuit having a low cutoff frequency but also the second filter circuit having a high cutoff frequency, it is possible to appropriately simplify the configuration of the power conversion device.

In an eighth configuration, the first voltage converter includes: a primary-side circuit connected to the first battery; the secondary-side circuit of the third voltage converter serving as a secondary-side circuit of the first voltage converter, the secondary-side circuit of the first voltage converter being connected to the second battery; and an isolation transformer connecting the primary-side circuit to the secondary-side circuit.

In the above configuration, the secondary-side circuit is shared by the first voltage converter and the third voltage converter, and thus the configuration of the power conversion device can be appropriately simplified.

First Embodiment

A first embodiment in which a power conversion device according to the present disclosure is applied to a power supply system 100 to be mounted on a vehicle will be described below with reference to the drawings. The power supply system 100 includes a main battery 11 as a first battery, and an auxiliary battery 17 as a second battery.

As shown in FIG. 1, the power supply system 100 includes a power supply unit 10, a power conversion device 20, a charger ECU 15, and a DCDC converter (hereinafter referred to as a DDC) ECU 16. The power supply system 100 can be connected to an AC power supply 200 via a first external terminal TA1 and a second external terminal TA2. The AC power supply 200 is, for example, a commercial power supply.

The power supply unit 10 includes the main battery 11. The main battery 11 is connected to the power conversion device 20 via a first connection path LC1 and a second connection path LC2, and a charging switching unit 12 is provided in the first connection path LC1 and the second connection path LC2. The charging switching unit 12 includes a first charge switch SC1 provided in the first connection path LC1, and a second charge switch SC2 provided in the second connection path LC2. Furthermore, the main battery 11 is connected to the power conversion device 20 via a third connection path LC3 and a fourth connection path LC4, and a discharging switching unit 13 is provided in the third connection path LC3 and the fourth connection path LC4. The discharging switching unit 13 includes a first discharge switch SD1 provided in the third connection path LC3, and a second discharge switch SD2 provided in the fourth connection path LC4.

The power conversion device 20 includes a charger 30 as a charging circuit, and a first DDC 40. The charger 30 is connected to the main battery 11 via a fifth wiring LP5 and a sixth wiring LP6 and the first connection path LC1 and the second connection path LC2. Furthermore, the charger 30 is connected to the first external terminal TA1 and the second external terminal TA2 via a first AC terminal TB1 and a second AC terminal TB2. When the AC power supply 200 is connected to the first external terminal TA1 and the second external terminal TA2, the charger 30 converts AC power input from the AC power supply 200 into DC power, and charges the main battery 11 with the DC power.

The first DDC 40 is connected to the main battery 11 via a seventh wiring LP7 and an eighth wiring LP8 and the third connection path LC3 and the fourth connection path LC4. Furthermore, the first DDC 40 is connected to the auxiliary battery 17 via an output terminal TE. The auxiliary battery 17 is a battery having a lower rated voltage than the main battery 11, and the first DDC 40 steps down a power supply voltage VB of the main battery 11 to a reference voltage VK and outputs the reference voltage VK to the auxiliary battery 17. In the present embodiment, the first DDC 40 corresponds to a "voltage converter" and a "first voltage converter".

The ECUs 15 and 16 are a control device including a known microcomputer composed of a CPU, a ROM, a RAM, a flash memory, and the like. The ECUs 15 and 16 acquire various signals, and perform various controls based on the acquired information. Specifically, the charger ECU 15 controls the charger 30 based on an AC voltage VAC of the AC power supply 200 applied to the charger 30. The DDC ECU 16 controls the first DDC 40 based on the power supply voltage VB applied to the first DDC 40.

Figure 2:
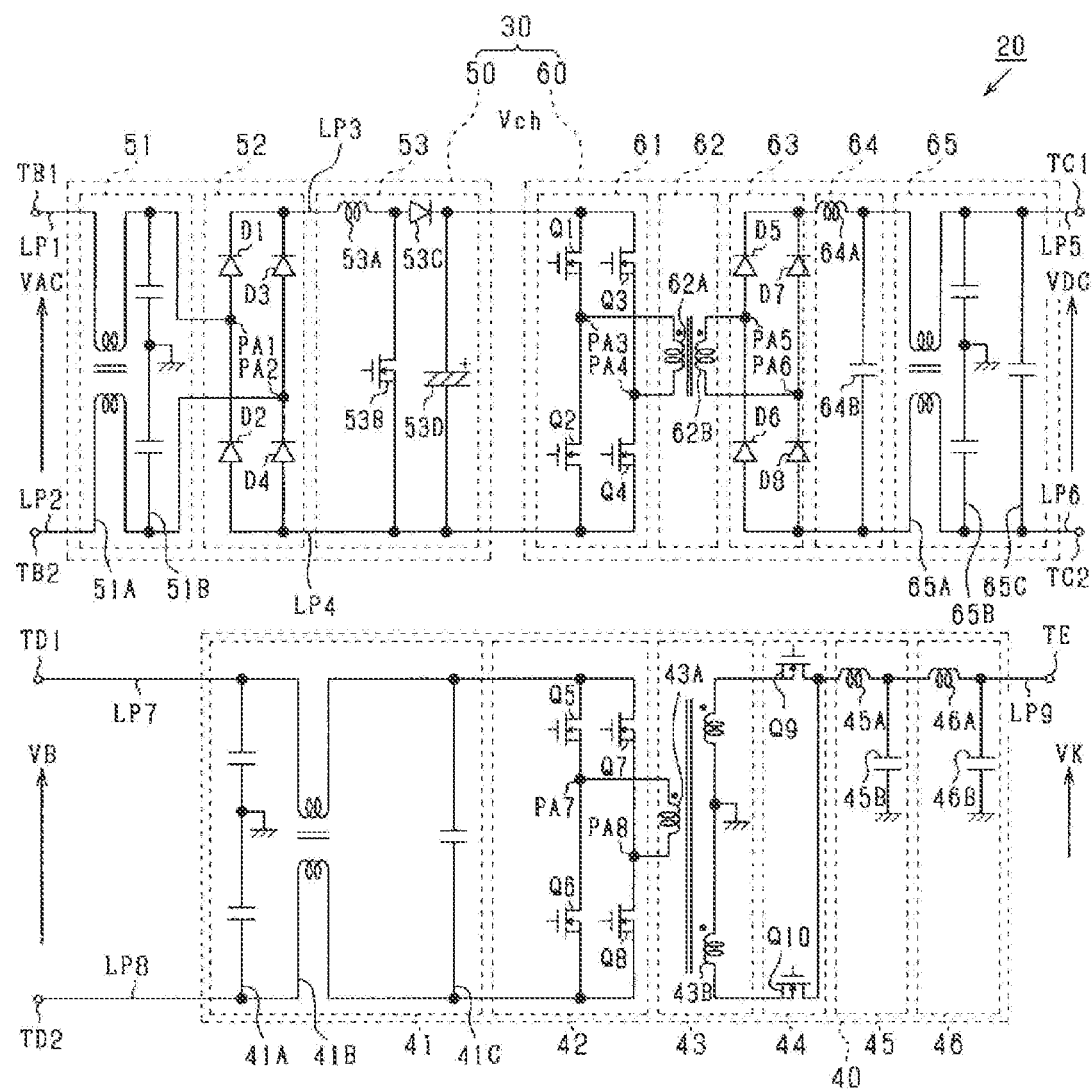
FIG. 2 is a configuration diagram of a power conversion device according to the first embodiment.

Next, the configuration of the power conversion device 20 will be described in detail. First, the charger 30 will be described. As shown in FIG. 2, the charger 30 includes a power conversion circuit 50, and a second DDC 60 as a second voltage converter.

The power conversion circuit 50 is an ACDC converter that converts AC power input from the AC power supply 200 into DC power, and includes a filter circuit 51, a rectifier circuit 52, and a PFC (Power Factor Correction) circuit 53.

The filter circuit 51 is a circuit that removes noise superimposed on the AC voltage VAC, and includes a common mode filter 51A and a Y capacitor 51B. A Y capacitor is an element in which two capacitors are connected in series and an intermediate point of the two capacitors is grounded. The common mode filter 51A and the Y capacitor 51B are connected in parallel between a first wiring LP1 connected to the first AC terminal TB1 and a second wiring LP2 connected to the second AC terminal TB2. The common mode filter 51A is provided at a position closer to the first AC terminal TB1 and the second AC terminal TB2 than the Y capacitor 51B is.

The rectifier circuit 52 is a diode bridge circuit as a full-wave rectifier circuit including a first diode D1 to a fourth diode D4 as rectifier elements, and an anode of the first diode D1 is connected to a cathode of the second diode D2 to constitute a first series circuit. An anode of the third diode D3 is connected to a cathode of the fourth diode D4 to constitute a second series circuit. The first series circuit and the second series circuit are connected in parallel.

A first intermediate point PA1 between the first diode D1 and the second diode D2 of the first series circuit is connected to the first wiring LP1. A second intermediate point PA2 between the third diode D3 and the fourth diode D4 of the second series circuit is connected to the second wiring LP2. Cathodes of the first diode D1 and the third diode D3 are connected to a first end of a third wiring LP3, and anodes of the second diode D2 and the fourth diode D4 are connected to a first end of a fourth wiring LP4.

The PFC circuit 53 is a circuit that adjusts the phase and frequency of the AC voltage VAC and an AC current IAC input from the AC power supply 200 to improve the power factor. The PFC circuit 53 includes a reactor 53A, a PFC switch 53B, a diode 53C, and a smoothing capacitor 53D. The reactor 53A and the diode 53C are provided in the third wiring LP3. A cathode of the diode 53C is connected to the second DDC 60, and an anode of the diode 53C is connected to the reactor 53A.

The PFC switch 53B is a voltage-driven switch, and is an N-channel MOSFET in the present embodiment. The PFC switch 53B is connected between the third wiring LP3 and the fourth wiring LP4. Specifically, a drain of the PFC switch 53B is connected to the third wiring LP3 between the reactor 53A and the diode 53C, and a source of the PFC switch 53B is connected to the fourth wiring LP4.

The smoothing capacitor 53D is connected between the third wiring LP3 and the fourth wiring LP4 at a position closer to the second DDC 60 than the diode 53C is. The smoothing capacitor 53D is, for example, an electrolytic capacitor.

The second DDC 60 is a voltage converter that converts a conversion voltage Vch output from the power conversion circuit 50 to a voltage and outputs the voltage to the main battery 11. The second DDC 60 includes a conversion circuit 61, a transformer 62, a rectifier circuit 63, a smoothing circuit 64, and a filter circuit 65.

The conversion circuit 61 is a DCAC converter that converts the DC power of the power conversion circuit 50 into AC power in order to convert the conversion voltage Vch output from the power conversion circuit 50. By converting the DC power into AC power and then converting the AC power, the conversion voltage Vch output from the power conversion circuit 50 can be easily converted in an insulated state, as compared with the case where the DC power is directly converted.

The conversion circuit 61 includes a first switch Q1 to a fourth switch Q4 that are N-channel MOSFETs, and a source of the first switch Q1 is connected to a drain of the second switch Q2 to constitute a third series circuit. A source of the third switch Q3 is connected to a drain of the fourth switch Q4 to constitute a fourth series circuit. The third series circuit and the fourth series circuit are connected in parallel.

A third intermediate point PA3 between the first switch Q1 and the second switch Q2 of the third series circuit is connected to a first end of a primary coil 62A of the transformer 62. A fourth intermediate point PA4 between the third switch Q3 and the fourth switch Q4 of the fourth series circuit is connected to a second end of the primary coil 62A of the transformer 62. Drains of the first switch Q1 and the third switch Q3 are connected to a second end of the third wiring LP3, and sources of the second switch Q2 and the fourth switch Q4 are connected to a second end of the fourth wiring LP4.

The transformer 62 is an isolation transformer, and includes the primary coil 62A and a secondary coil 62B. The rectifier circuit 63 is a diode bridge circuit including a fifth diode D5 to an eighth diode D8. The configuration of the rectifier circuit 63 is substantially the same as that of the rectifier circuit 52, and thus redundant description will be omitted.

A fifth intermediate point PA5 between the fifth diode D5 and the sixth diode D6 of a fifth series circuit is connected to a first end of the secondary coil 62B of the transformer 62. A sixth intermediate point PA6 between the seventh diode D7 and the eighth diode D8 of a sixth series circuit is connected to a second end of the secondary coil 62B of the transformer 62. Cathodes of the fifth diode D5 and the seventh diode D7 are connected to a first end of the fifth wiring LP5 as a high-voltage side wiring, and anodes of the sixth diode D6 and the eighth diode D8 are connected to a first end of the sixth wiring LP6 as a low-voltage side wiring. The fifth wiring LP5 is connected to a high-voltage input side of the main battery 11 via the smoothing circuit 64 and the filter circuit 65, and the sixth wiring LP6 is connected to a low-voltage input side of the main battery 11 via the smoothing circuit 64 and the filter circuit 65. That is, the fifth wiring LP5 and the sixth wiring LP6 are a charging path that connects the charger 30 to the main battery 11.

The conversion voltage Vch output from the power conversion circuit 50 is converted to a DC voltage VDC by the conversion circuit 61, the transformer 62, and the rectifier circuit 63. The converted DC voltage VDC is output to the main battery 11 via the fifth wiring LP5 and the sixth wiring LP6.

The smoothing circuit 64 is a circuit that removes noise superimposed on the DC voltage VDC, and is an LC filter including a reactor 64A and a capacitor 64B. The reactor 64A is provided in the fifth wiring LP5. A first end of the reactor 64A is connected to the cathodes of the fifth diode D5 and the seventh diode D7, and a second end of the reactor 64A is connected to a first end of the capacitor 64B. A second end of the capacitor 64B is connected to the sixth wiring LP6.

The filter circuit 65 is a circuit that removes noise that is superimposed on the DC voltage VDC and cannot be removed by the smoothing circuit 64. The filter circuit 65 includes a common mode filter 65A, a Y capacitor 65B, and a capacitor 65C.

The common mode filter 65A, the Y capacitor 65B, and the capacitor 65C are connected in parallel between the fifth wiring LP5 and the sixth wiring LP6. The common mode filter 65A is provided at a position closer to the smoothing circuit 64 than the Y capacitor 65B is, and the capacitor 65C is provided at a position closer to the main battery 11 than the Y capacitor 65B is.

Next, the first DDC 40 will be described. As shown in FIG. 2, the first DDC 40 includes an input-side filter circuit 41, a conversion circuit 42, a transformer 43, a rectifier circuit 44, a smoothing circuit 45 as a first filter circuit, and an output-side filter circuit 46 as a second filter circuit.

The input-side filter circuit 41 is a circuit that removes noise superimposed on the power supply voltage VB of the main battery 11, and includes a Y capacitor 41A, a common mode filter 41B, and a capacitor 41C.

The Y capacitor 41A, the common mode filter 41B, and the capacitor 41C are connected in parallel between the seventh wiring LP7 connected to the high-voltage input side of the main battery 11 and the eighth wiring LP8 connected to the low-voltage input side of the main battery 11. That is, the seventh wiring LP7 and the eighth wiring LP8 are a voltage conversion path that connects the first DDC 40 to the main battery 11. The Y capacitor 41A is provided at a position closer to the main battery 11 than the common mode filter 41B is, and the capacitor 41C is provided at a position closer to the conversion circuit 42 than the common mode filter 41B is.

The conversion circuit 42 is a DCAC converter that converts the DC power of the main battery 11 into AC power in order to step down the power supply voltage VB of the main battery 11. By converting the DC power into AC power and then stepping down the AC power, the power supply voltage VB of the main battery 11 can be easily stepped down in an insulated state, as compared with the case where the DC power is directly stepped down.

The conversion circuit 42 includes a fifth switch Q5 to an eighth switch Q8 that are N-channel MOSFETs. The configuration of the conversion circuit 42 is substantially the same as that of the conversion circuit 61, and thus redundant description will be omitted.

A seventh intermediate point PA7 between the fifth switch Q5 and the sixth switch Q6 of a seventh series circuit is connected to a first end of a primary coil 43A of the transformer 43. An eighth intermediate point PA8 between the seventh switch Q7 and the eighth switch Q8 of an eighth series circuit is connected to a second end of the primary coil 43A of the transformer 43. Drains of the fifth switch Q5 and the seventh switch Q7 are connected to a first end of the seventh wiring LP7, and sources of the sixth switch Q6 and the eighth switch Q8 are connected to a first end of the eighth wiring LP8.

The transformer 43 is an isolation transformer, and includes the primary coil 43A and a secondary coil 43B. In the present embodiment, the secondary coil 43B includes an intermediate tap. The intermediate tap is connected to a body ground of the vehicle.

The rectifier circuit 44 is a DCAC converter that converts the AC power output from the secondary coil 43B into DC power by synchronous rectification. The rectifier circuit 44 includes a ninth switch Q9 and a tenth switch Q10.

A first end of the secondary coil 43B is connected to a source of the ninth switch Q9, and a second end of the secondary coil 43B is connected to a source of the tenth switch Q10. Drains of the ninth switch Q9 and the tenth switch Q10 are connected to a first end of a ninth wiring LP9. The ninth wiring LP9 is connected to the output terminal TE via the smoothing circuit 45 and the output-side filter circuit 46.

The power supply voltage VB of the main battery 11 is stepped down to the reference voltage VK by the conversion circuit 42, the transformer 43, and the rectifier circuit 44. The stepped-down reference voltage VK is output to the auxiliary battery 17 via the ninth wiring LP9 and the output terminal TE.

The smoothing circuit 45 is a circuit that removes noise superimposed on the reference voltage VK, and is an LC filter including a reactor 45A and a capacitor 45B. The output-side filter circuit 46 is a circuit that removes noise superimposed on the reference voltage VK, and in the output-side filter circuit 46, a cutoff frequency for removing the noise is set to a higher value than in the smoothing circuit 45. The output-side filter circuit 46 is an LC filter including a reactor 46A and a capacitor 46B, and is provided at a position closer to the auxiliary battery 17 than the smoothing circuit 45 is. The configurations of the smoothing circuit 45 and the output-side filter circuit 46 are substantially the same as that of the smoothing circuit 64, and thus redundant description will be omitted.

In the power conversion device 20, the charger 30 and the first DDC 40 are both connected to the main battery 11. Thus, in the case where the fifth wiring LP5 and the sixth wiring LP6 of the charger 30 connected to the main battery 11 are connected to the seventh wiring LP7 and the eighth wiring LP8 of the first DDC 40 connected to the main battery 11, when the main battery 11 is charged by the charger 30, part of the DC power generated by the charger 30 is supplied to the first DDC 40, and the DC voltage VDC is applied to the first DDC 40. If the DC voltage VDC exceeds a predetermined threshold in the first DDC 40, due to the DC voltage VDC, the DDC ECU 16 that controls the first DDC 40 is started, leading to an increase in power consumed in the first DDC 40. The auxiliary battery 17 is less likely to be used during charging of the main battery 11; thus, there is no need for the DDC ECU 16 to be started. The start of the DDC ECU 16 causes unnecessary power consumption in the first DDC 40, resulting in a problem such as a longer charging time for the main battery 11.

Thus, in the present embodiment, the power conversion device 20 is configured to be able to interrupt the supply of the DC power output from the charger 30 to the first DDC 40 during charging of the main battery 11. Specifically, a second end of the fifth wiring LP5 of the charger 30 is connected to a first DC terminal TC1, and a second end of the sixth wiring LP6 of the charger 30 is connected to a second DC terminal TC2. Furthermore, a second end of the seventh wiring LP7 of the first DDC 40 is connected to a first input terminal TD1, which is different from the first DC terminal TC1, and a second end of the eighth wiring LP8 of the first DDC 40 is connected to a second input terminal TD2, which is different from the second DC terminal TC2.

The first DC terminal TC1 and the second DC terminal TC2 are connected to a connector different from a connector to which the first input terminal TD1 and the second input terminal TD2 are connected. As shown in FIG. 1, the first DC terminal TC1 and the second DC terminal TC2 are connected to a first connector CN1 as a charging-side connector. The first connector CN1 connects the charger 30 to the main battery 11. Furthermore, the first input terminal TD1 and the second input terminal TD2 are connected to a second connector CN2 as a voltage-conversion-side connector. The second connector CN2 connects an input side of the first DDC 40 to the main battery 11. The first connector CN1 and the second connector CN2 are separately provided.

In the present embodiment, the first connector CN1 and the second connector CN2 are separately provided. Thus, in the power conversion device 20, the charger 30 can be separated from the first DDC 40, allowing the interruption of the power supply between the charger 30 and the first DDC 40. This makes it possible to achieve lower power consumption in the first DDC 40 during charging of the main battery 11. In the present embodiment, the first connector CN1 and the second connector CN2 correspond to an "interrupting unit".

According to the present embodiment described in detail above, the following effects can be obtained.

In the present embodiment, the charger 30 that converts the AC power input from the AC power supply 200 into DC power and charges the main battery 11 with the DC power and the first DDC 40 that converts the power supply voltage VB of the main battery 11 and outputs the converted voltage to the auxiliary battery 17 are both connected to the main battery 11. Furthermore, the power conversion device 20 is configured to be able to interrupt the supply of the DC power from the charger 30 to the first DDC 40 during charging of the main battery 11 by the charger 30. By interrupting the supply of the DC power from the charger 30 to the first DDC 40, it is possible to prevent an increase in the voltage applied to the first DDC 40, thus preventing the start of the DDC ECU 16 that controls the first DDC 40. This makes it possible to achieve lower power consumption in the first DDC 40 during charging of the main battery 11.

Specifically, the first connector CN1 that connects the charger 30 to the main battery 11 is provided separately from the second connector CN2 that connects the first DDC 40 to the main battery 11. Thus, the charger 30 can be separated from the first DDC 40 in the power conversion device 20. Specifically, the fifth wiring LP5 and the sixth wiring LP6 that connect the charger 30 to the main battery 11 can be separated from the seventh wiring LP7 and the eighth wiring LP8 that connect the first DDC 40 to the main battery 11, making it possible to interrupt the power supply between the charger 30 and the first DDC 40.

Second Embodiment

Figure 3:
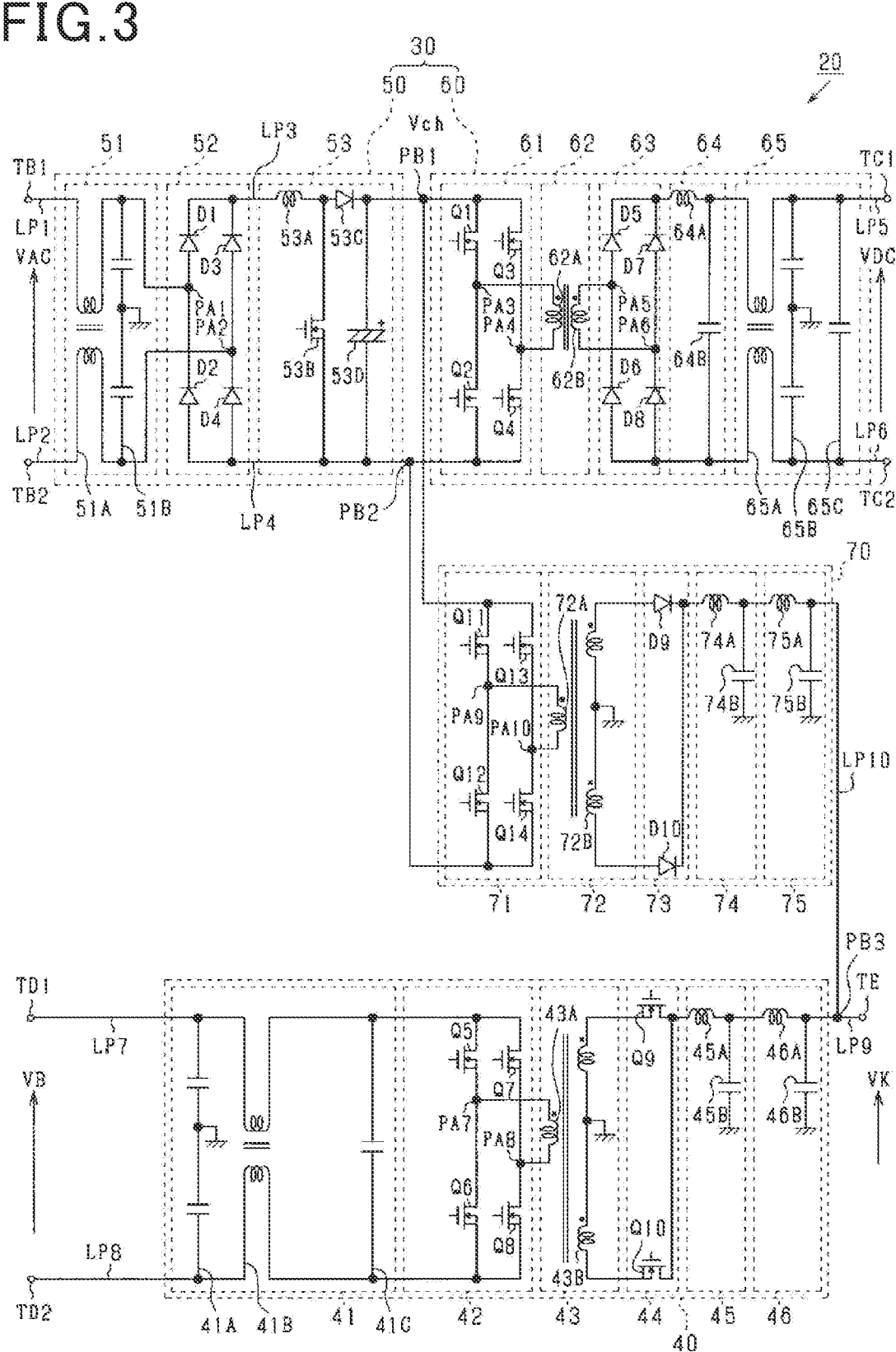
FIG. 3 is a configuration diagram of a power conversion device according to a second embodiment.

A second embodiment will be described below with reference to FIG. 3, focusing on differences from the first embodiment. In FIG. 3, the same components as those shown in FIG. 2 above are denoted by the same reference numerals, and the description thereof will be omitted for convenience.

The present embodiment differs from the first embodiment in that a third DDC 70 as a third voltage converter is connected between a portion of the power conversion circuit 50 of the charger 30 and a portion of the first DDC 40, the portion of the power conversion circuit 50 being connected to the second DDC 60, the portion of the first DDC 40 being connected to the auxiliary battery 17. FIG. 3 shows a configuration of the power conversion device 20 according to the present embodiment.

The third DDC 70 is a step-down circuit that steps down the conversion voltage Vch output from the power conversion circuit 50 and outputs the stepped-down voltage to the auxiliary battery 17. The third DDC 70 includes a conversion circuit 71, a transformer 72, a rectifier circuit 73, a smoothing circuit 74, and an output-side filter circuit 75.

The conversion circuit 71 includes an eleventh switch Q11 to a fourteenth switch Q14 that are N-channel MOSFETs. The transformer 72 is an isolation transformer, and includes a primary coil 72A and a secondary coil 72B. The configurations of the conversion circuit 71 and the transformer 72 are substantially the same as those of the conversion circuit 42 and the transformer 43, and thus redundant description will be omitted.

A ninth intermediate point PA9 between the eleventh switch Q11 and the twelfth switch Q12 of a ninth series circuit is connected to a first end of the primary coil 72A. A tenth intermediate point PA10 between the thirteenth switch Q13 and the fourteenth switch Q14 of a tenth series circuit is connected to a second end of the primary coil 72A. Drains of the eleventh switch Q11 and the thirteenth switch Q13 are connected to a first connection point PB1 that is located at a portion of the third wiring LP3 between the power conversion circuit 50 and the second DDC 60. Sources of the twelfth switch Q12 and the fourteenth switch Q14 are connected to a second connection point PB2 that is located at a portion of the fourth wiring LP4 between the power conversion circuit 50 and the second DDC 60.

The rectifier circuit 73 is a DCAC converter that includes a ninth diode D9 and a tenth diode D10 as rectifier elements and converts the AC power output from the secondary coil 72B into DC power. A first end of the secondary coil 72B is connected to an anode of the ninth diode D9, and a second end of the secondary coil 72B is connected to a source of the tenth diode D10. Cathodes of the ninth diode D9 and the tenth diode D10 are connected to a first end of a tenth wiring LP10. The tenth wiring LP10 is connected via the smoothing circuit 74 and the output-side filter circuit 75 to a third connection point PB3 that is located at a portion of the ninth wiring LP9 between the first DDC 40 and the output terminal TE.

The conversion voltage Vch output from the power conversion circuit 50 is stepped down to the reference voltage VK by the conversion circuit 71, the transformer 72, and the rectifier circuit 73. The stepped-down reference voltage VK is output to the auxiliary battery 17 via the ninth wiring LP9 and the tenth wiring LP10.

The smoothing circuit 74 is an LC filter including a reactor 74A and a capacitor 74B. The output-side filter circuit 75 is an LC filter including a reactor 75A and a capacitor 75B. The configurations of the smoothing circuit 74 and the output-side filter circuit 75 are substantially the same as those of the smoothing circuit 45 and the output-side filter circuit 46, and thus redundant description will be omitted.

A rated output current of the third DDC 70 is set to a smaller value than that of the first DDC 40. Thus, an allowable current of the smoothing circuit 74 and the output-side filter circuit 75 of the third DDC 70 is set to a smaller value than that of the smoothing circuit 45 and the output-side filter circuit 46 of the first DDC 40.

In the present embodiment, the third DDC 70 is connected between a portion of the power conversion circuit 50 of the charger 30 and a portion of the first DDC 40, the portion of the power conversion circuit 50 being connected to the second DDC 60, the portion of the first DDC 40 being connected to the auxiliary battery 17. Thus, by using the third DDC 70, it is possible to charge the auxiliary battery 17 using the AC power input from the AC power supply 200, without driving the first DDC 40.

In particular, in the present embodiment, the required rated output of the third DDC 70 that is used for operation of the charger 30 is lower than the required rated output of the first DDC 40 that is mainly used for vehicle travel; thus, the third DDC 70 requires less power to step down the voltage than the first DDC 40. Therefore, the use of the third DDC 70 can achieve lower power consumption during charging of the auxiliary battery 17.

On the other hand, since the charger 30 is connected to the first DDC 40 by the third DDC 70, there is a concern that power consumption in the first DDC 40 may be increased during charging of the main battery 11. In the present embodiment, the third DDC 70 is configured such that a primary-side circuit located at a position closer to the power conversion circuit 50 than the primary coil 72A of the transformer 72 is connected via the transformer 72 as an isolation transformer to a secondary-side circuit located at a position closer to the first DDC 40 than the secondary coil 72B of the transformer 72. Thus, even though the third DDC 70 is provided, the insulation is secured between the charger 30 and the first DDC 40. Furthermore, the third DDC 70 and the first DDC 40 are both a step-down circuit, and the output sides, i.e., the low-voltage sides, of these step-down circuits are connected to each other. Thus, even when the reference voltage VK obtained by stepping down the conversion voltage Vch in the third DDC 70 is applied to a portion of the first DDC 40 connected to the auxiliary battery 17, the DDC ECU 16 that controls the first DDC 40 is not started, making it possible to achieve lower power consumption in the first DDC 40 during charging of the main battery 11.

Third Embodiment

Figure 4:
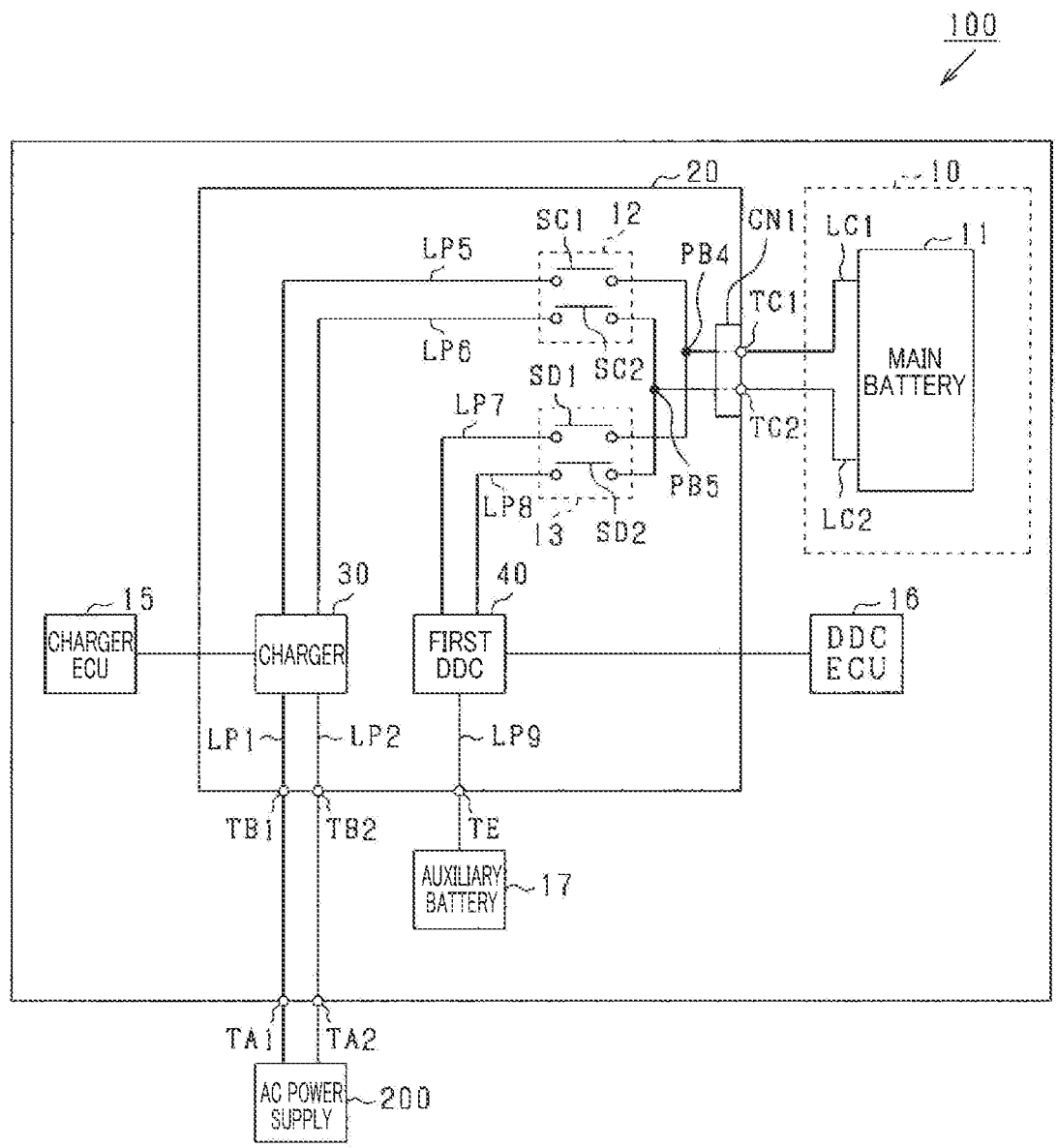
FIG. 4 is a configuration diagram of a power supply system according to a third embodiment.
Figure 5:
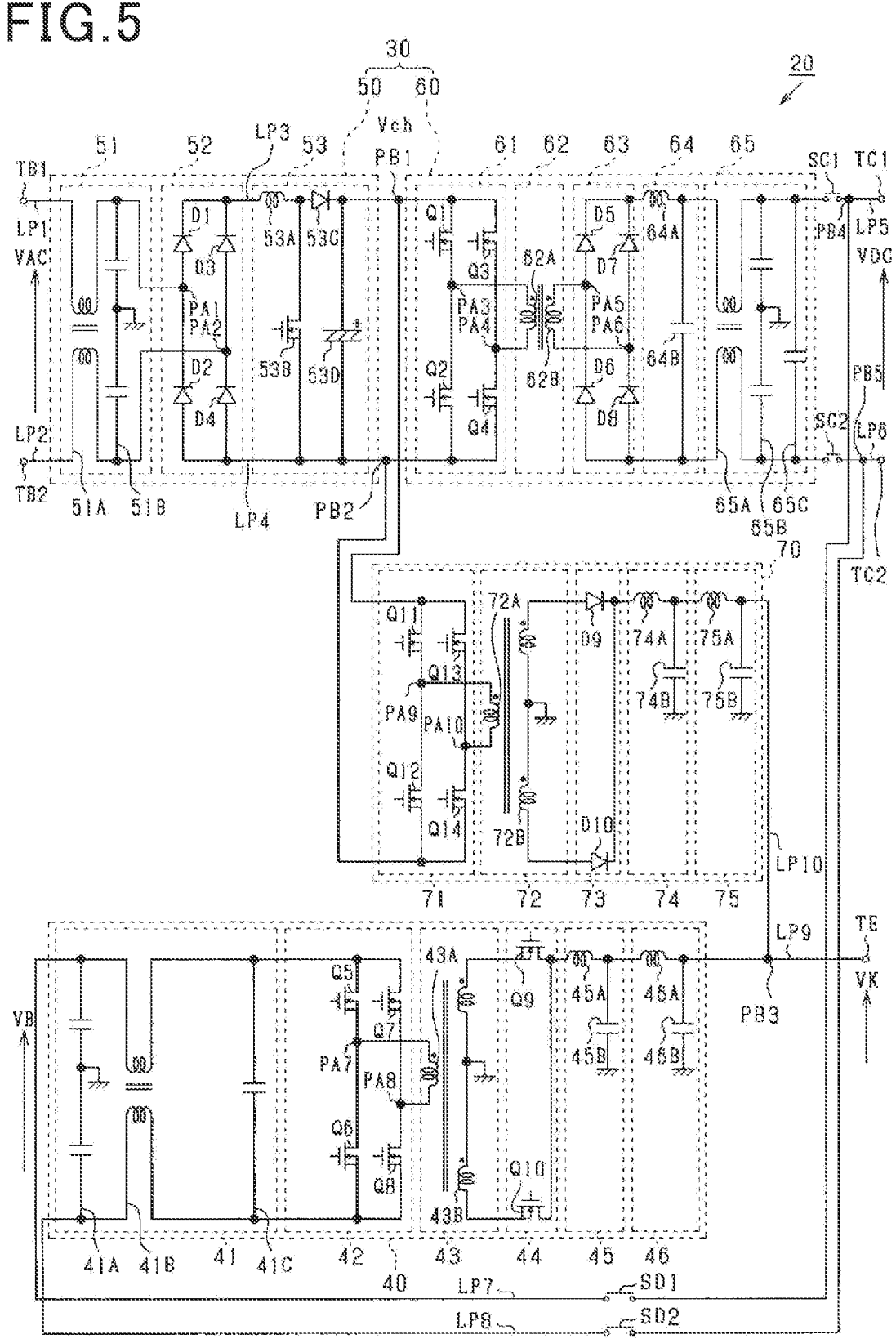
FIG. 5 is a configuration diagram of a power conversion device according to the third embodiment.

A third embodiment will be described below with reference to FIGS. 4 to 6, focusing on differences from the second embodiment. In FIG. 4, the same components as those shown in FIG. 1 above are denoted by the same reference numerals, and the description thereof will be omitted for convenience.

The present embodiment differs from the second embodiment in that the power conversion device 20 does not include the second connector CN2. FIG. 4 shows a configuration of the power conversion device 20 according to the present embodiment. The second end of the seventh wiring LP7 of the first DDC 40 is connected to the fifth wiring LP5 of the charger 30 at a fourth connection point PB4. The second end of the eighth wiring LP8 of the first DDC 40 is connected to the sixth wiring LP6 of the charger 30 at a fifth connection point PB5. That is, the fifth wiring LP5 as the charging path is connected to the seventh wiring LP7 as the voltage conversion path at the fourth connection point PB4, and the sixth wiring LP6 as the charging path is connected to the eighth wiring LP8 as the voltage conversion path at the fifth connection point PB5. In the present embodiment, the fourth connection point PB4 and the fifth connection point PB5 correspond to a "connection point".

The present embodiment differs from the second embodiment in that the charging switching unit 12 and the discharging switching unit 13 are provided not in the power supply unit 10 but in the power conversion device 20. FIG. 5 shows a configuration of the power conversion device 20 according to the present embodiment. In FIG. 5, the same components as those shown in FIG. 3 above are denoted by the same reference numerals, and the description thereof will be omitted for convenience.

In the charging switching unit 12, the first charge switch SC1 is provided at a portion of the fifth wiring LP5 closer to the charger 30 than the fourth connection point PB4 is, and the second charge switch SC2 is provided at a portion of the sixth wiring LP6 closer to the charger 30 than the fifth connection point PB5 is. In the discharging switching unit 13, the first discharge switch SD1 is provided at a portion of the seventh wiring LP7 closer to the first DDC 40 than the fourth connection point PB4 is, and the second discharge switch SD2 is provided at a portion of the eighth wiring LP8 closer to the first DDC 40 than the fifth connection point PB5 is. In the present embodiment, the first charge switch SC1 and the second charge switch SC2 correspond to the "interrupting unit" and a "second switch unit", and the first discharge switch SD1 and the second discharge switch SD2 correspond to the "interrupting unit", an "switch unit", and a "first switch unit".

In the present embodiment, the second end of the seventh wiring LP7 of the first DDC 40 is connected to the fifth wiring LP5 of the charger 30 at the fourth connection point PB4, and the second end of the eighth wiring LP8 of the first DDC 40 is connected to the sixth wiring LP6 of the charger 30 at the fifth connection point PB5. Thus, the charger 30 and the first DDC 40 can be connected to the main battery 11 using the first connector CN1 shared by the charger 30 and the first DDC 40.

On the other hand, since the charger 30 is connected to the first DDC 40 by the fifth wiring LP5 to the eighth wiring LP8, there is a concern that power consumption in the first DDC 40 may be increased during charging of the main battery 11. In the present embodiment, the first discharge switch SD1 is provided at a portion of the seventh wiring LP7 closer to the first DDC 40 than the fourth connection point PB4 is, and the second discharge switch SD2 is provided at a portion of the eighth wiring LP8 closer to the first DDC 40 than the fifth connection point PB5 is. Thus, by performing a switching process of causing the first discharge switch SD1 and the second discharge switch SD2 to be in an OFF state during charging of the main battery 11, the supply of the DC power from the charger 30 to the charger 30 is prevented, making it possible to achieve lower power consumption in the first DDC 40 during charging of the main battery 11.

If the power conversion device 20 includes the first discharge switch SD1 and the second discharge switch SD2 but does not include the first charge switch SC1 and the second charge switch SC2, the power supply voltage VB of the main battery 11 is applied to the charger 30 during conversion performed by the first DDC 40. In the present embodiment, the second DDC 60 of the charger 30 is a voltage converter, and the power supply voltage VB is applied to the output side of the voltage converter, i.e., a portion of the voltage converter connected to the main battery. Thus, if the power supply voltage VB exceeds a predetermined threshold in the second DDC 60, due to the power supply voltage VB, the charger ECU 15 that controls the charger 30 is started, leading to an increase in power consumed in the charger 30.

In the present embodiment, the first charge switch SC1 is provided at a portion of the fifth wiring LP5 closer to the charger 30 than the fourth connection point PB4 is, and the second charge switch SC2 is provided at a portion of the sixth wiring LP6 closer to the charger 30 than the fifth connection point PB5 is. Thus, by performing a switching process of causing the first charge switch SC1 and the second charge switch SC2 to be in the OFF state during conversion performed by the first DDC 40, the application of the power supply voltage VB of the main battery 11 to the charger 30 is prevented. This makes it possible to achieve lower power consumption in the charger 30 during conversion performed by the first DDC 40.

Figure 6:
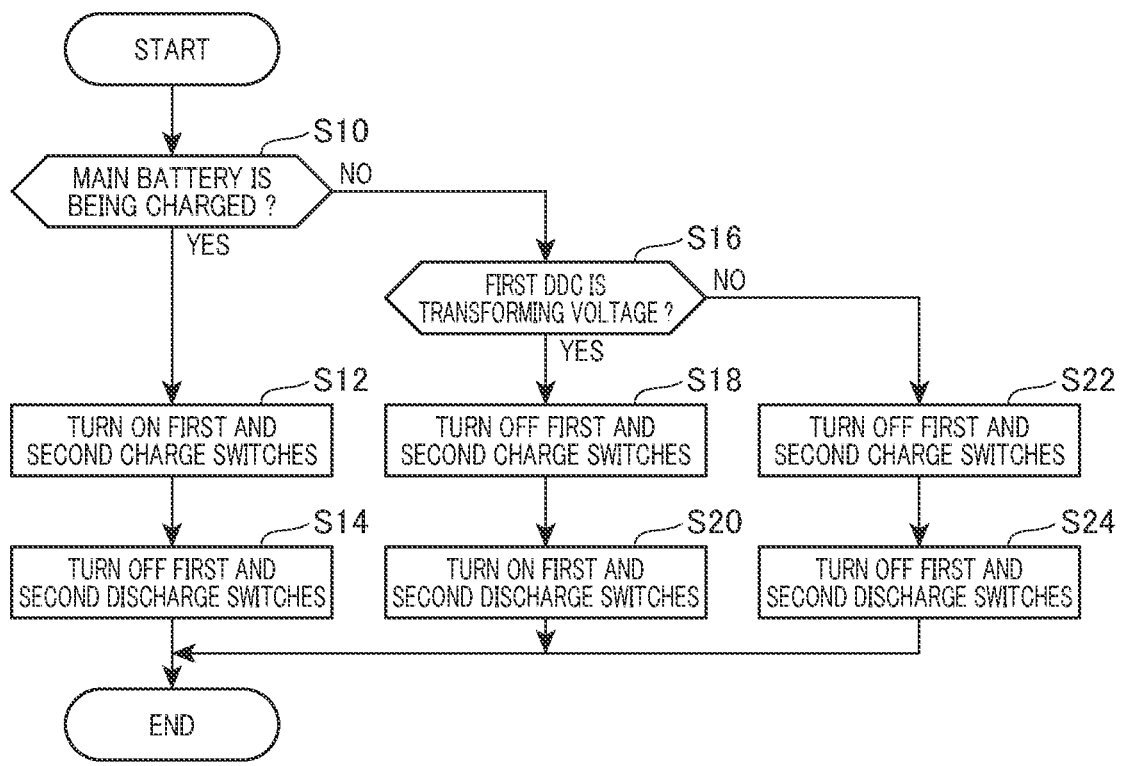
FIG. 6 is a flow chart of a switching process.

FIG. 6 shows a flow chart of the switching process of the present embodiment. The ECUs 15 and 16 repeatedly perform the switching process for each predetermined period when the main battery 11 is charged by the charger 30 and when the vehicle is started.

When the switching process is started, first, in step S10, it is determined whether the main battery 11 is being charged. The determination in step S10 is performed by the charger ECU 15 based on the AC voltage VAC. When an affirmative determination is made in step S10, in step S12, the first charge switch SC1 and the second charge switch SC2 are turned ON. In subsequent step S14, the first discharge switch SD1 and the second discharge switch SD2 are turned OFF, and the switching process is ended.

On the other hand, when a negative determination is made in step S10, in step S16, it is determined whether the first DDC 40 is converting the voltage. The determination in step S16 is performed by the DDC ECU 16 based on the state of charge of the auxiliary battery 17. When an affirmative determination is made in step S16, in step S18, the first charge switch SC1 and the second charge switch SC2 are turned OFF. In subsequent step S20, the first discharge switch SD1 and the second discharge switch SD2 are turned ON, and the switching process is ended.

On the other hand, when a negative determination is made in step S16, in step S22, the first charge switch SC1 and the second charge switch SC2 are turned OFF. In subsequent step S24, the first discharge switch SD1 and the second discharge switch SD2 are turned OFF, and the switching process is ended. The switching process can achieve lower power consumption in the first DDC 40 during charging of the main battery 11, and also achieve lower power consumption in the charger 30 during conversion performed by the first DDC 40.

Other Embodiments

The above embodiments may be implemented with the following modifications.

Although the above embodiments show an example in which the auxiliary battery 17 has a lower rated voltage than the main battery 11, the auxiliary battery 17 may have a higher rated voltage than the main battery 11. In such a case, the first DDC 40 serves as a step-up circuit.

Although the third embodiment shows an example in which the power conversion device 20 includes the first charge switch SC1 and the second charge switch SC2 and the first discharge switch SD1 and the second discharge switch SD2, the power conversion device 20 may not necessarily include the first charge switch SC1 and the second charge switch SC2, and may include only the first discharge switch SD1 and the second discharge switch SD2.

Although the above embodiments show an example in which the first DDC 40 and the third DDC 70 are separately provided, parts of the DDCs 40 and 70 may be integrated together.

Figure 7:
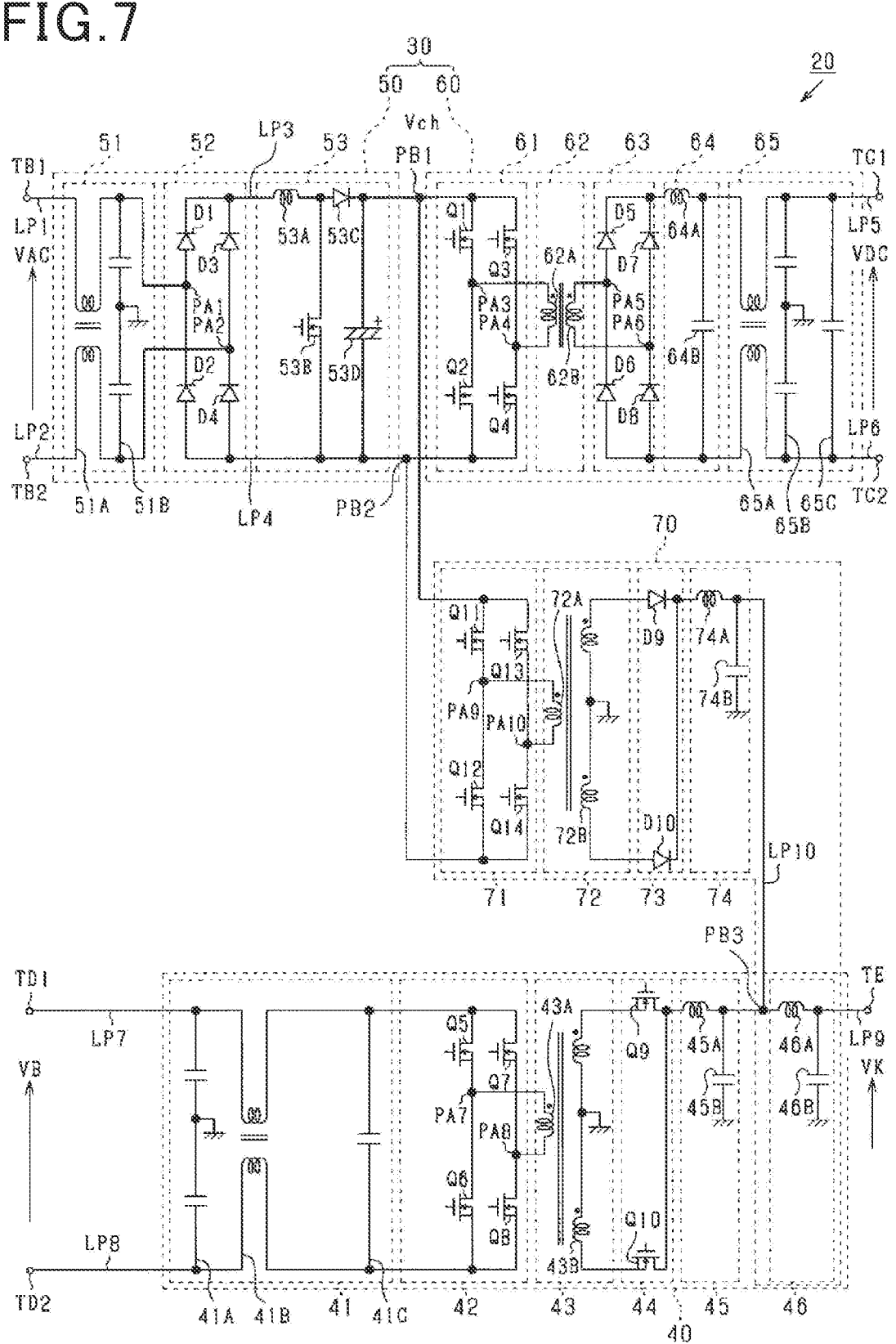
FIG. 7 is a configuration diagram of a power conversion device according to another embodiment.

For example, as shown in FIG. 7, the first DDC 40 and the third DDC 70 may share the output-side filter circuit 46. That is, the first DDC 40 and the third DDC 70 may be connected to the auxiliary battery 17 via the output-side filter circuit 46 shared by the first DDC 40 and the third DDC 70. This eliminates the need for the output-side filter circuit 75 of the third DDC 70, and thus the configuration of the power conversion device 20 can be simplified.

Figure 8:
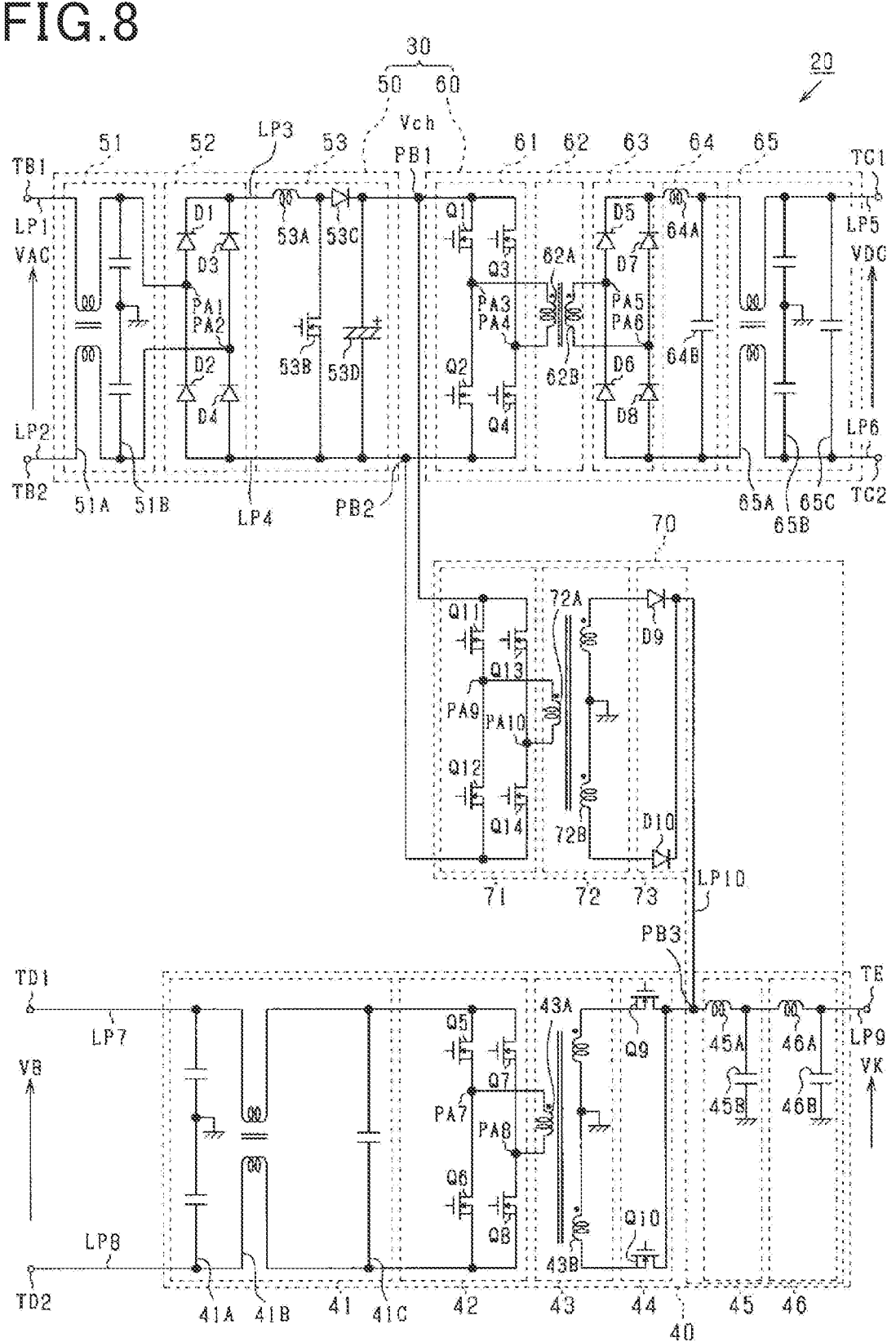
FIG. 8 is a configuration diagram of a power conversion device according to another embodiment.

Alternatively, as shown in FIG. 8, the first DDC 40 and the third DDC 70 may share the smoothing circuit 45 in addition to the output-side filter circuit 46. That is, the first DDC 40 and the third DDC 70 are connected to the auxiliary battery 17 via the smoothing circuit 45 and the output-side filter circuit 46 shared by the first DDC 40 and the third DDC 70. Since not only the output-side filter circuit 46 but also the smoothing circuit 45 is shared by the first DDC 40 and the third DDC 70, the configuration of the power conversion device 20 can be appropriately simplified.

In this embodiment, the first DDC 40 has a higher rated output current than the third DDC 70; thus, the smoothing circuit 45 of the first DDC 40 has a higher allowable current than the third DDC 70. Therefore, by sharing the smoothing circuit 45 of the first DDC 40 having a high allowable current, it is possible to appropriately simplify the configuration of the power conversion device 20 while reducing the noise generated in the first DDC 40 and the third DDC 70.

Figure 9:
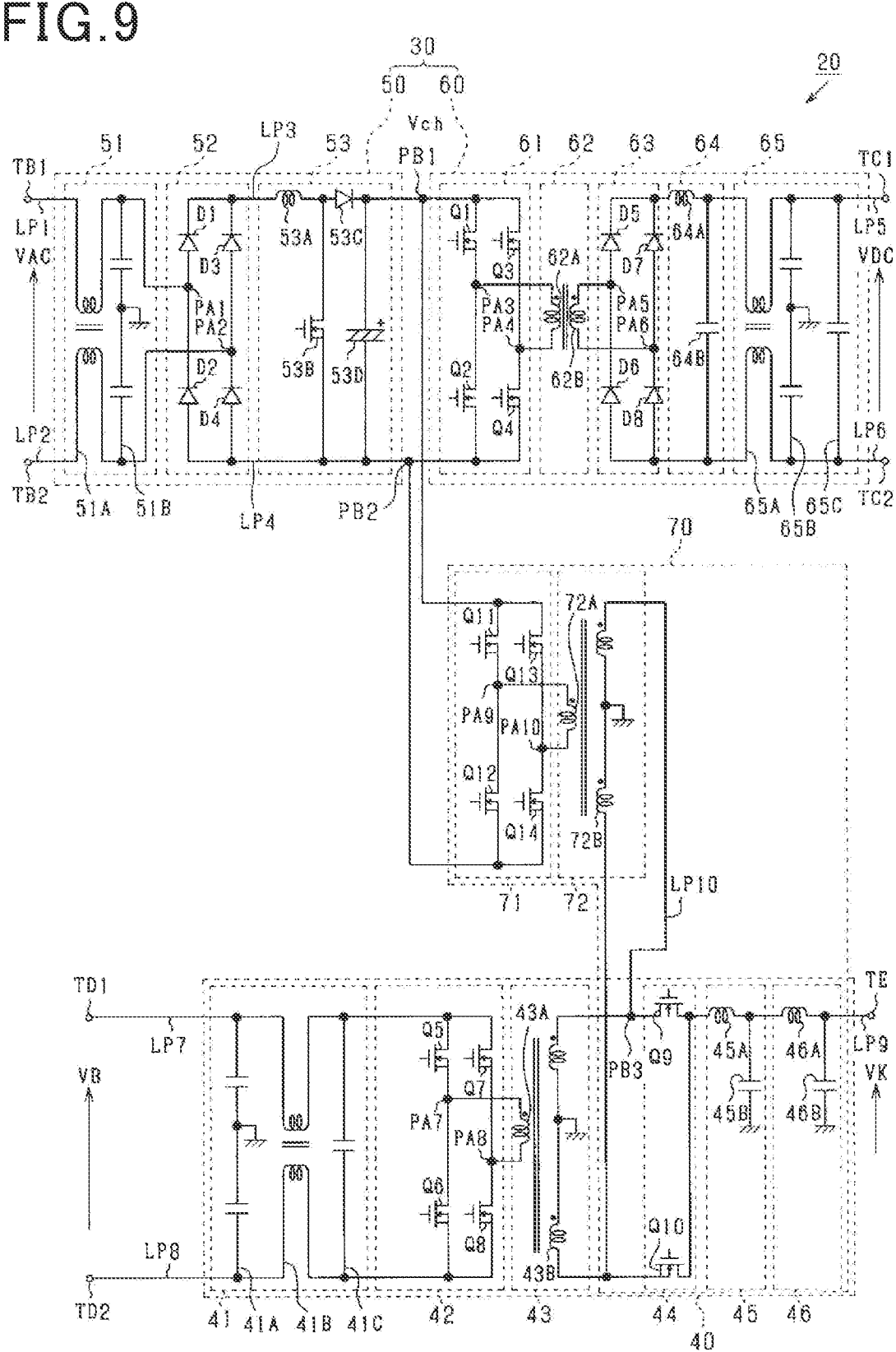
FIG. 9 is a configuration diagram of a power conversion device according to another embodiment.

Alternatively, as shown in FIG. 9, the first DDC 40 and the third DDC 70 may share the rectifier circuit 44 in addition to the smoothing circuit 45 and the output-side filter circuit 46. In this embodiment, the rectifier circuit 44 of the first DDC 40 is composed of the switches, and the rectifier circuit 73 of the third DDC 70 is composed of the diodes. This is to allow the rectifier circuit 44 of the first DDC 40 to have a higher allowable current than the rectifier circuit 73 of the third DDC 70. In this case, the first DDC 40 and the third DDC 70 preferably share the rectifier circuit 44 of the first DDC 40 composed of the switches. By sharing the rectifier circuit 44 of the first DDC 40 composed of the switches, it is possible to appropriately simplify the configuration of the power conversion device 20.

Figure 10:
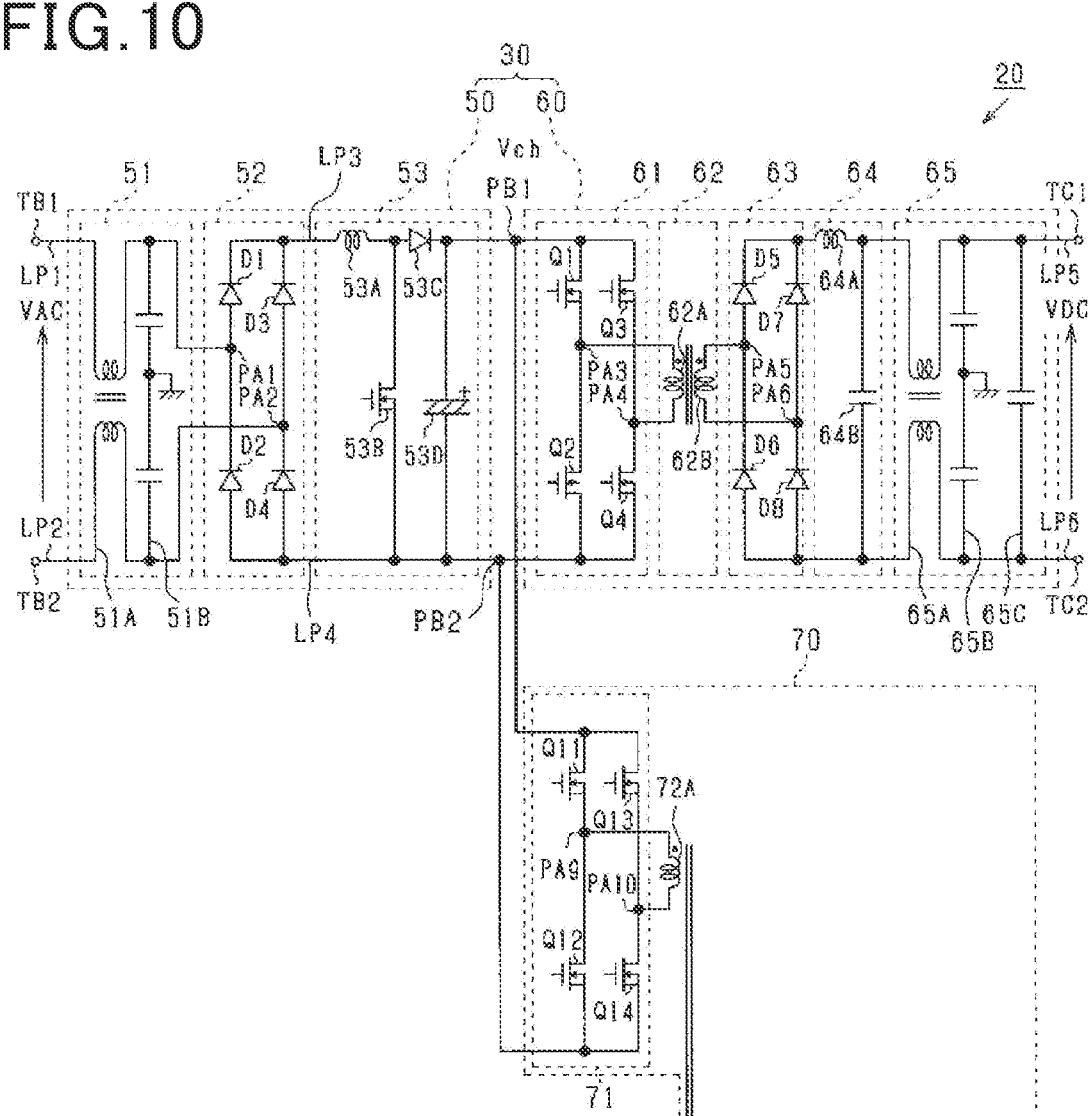
FIG. 10 is a configuration diagram of a power conversion device according to another embodiment.
Figure 10:
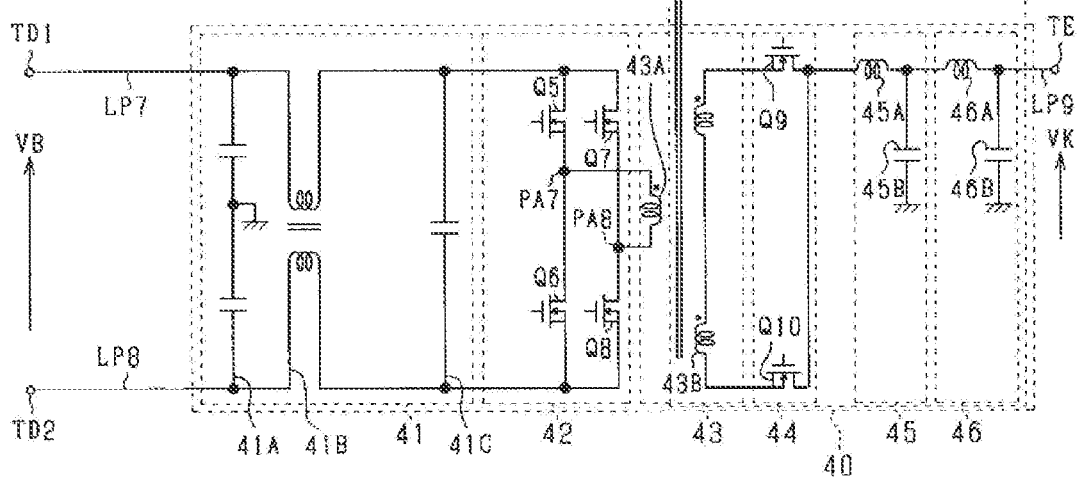

Alternatively, for example, as shown in FIG. 10, in the case where the first DDC 40 is configured such that a primary-side circuit located at a position closer to the main battery 11 than the primary coil 43A of the transformer 43 is connected via the transformer 43 as an isolation transformer to a secondary-side circuit located at a position closer to the auxiliary battery 17 than the secondary coil 43B of the transformer 43, the secondary-side circuit may be shared by the first DDC 40 and the third DDC 70. That is, the primary-side circuit of the first DDC 40 and the primary-side circuit of the third DDC 70 may be connected to the secondary-side circuit shared by the first DDC 40 and the third DDC 70. This can simplify the configuration of the power conversion device 20.

Although the present disclosure has been described in accordance with the embodiments, it is understood that the present disclosure is not limited to the embodiments and structures. The present disclosure includes various modifications and modifications within the equivalent range. In addition, various combinations and forms, as well as other combinations and forms including only one element, more or less, are within the scope and the range of ideas of the present disclosure.

What is claimed is:

1. A power conversion device that is applicable to a power supply system, the power supply system including a first battery and a second battery having a lower rated voltage than a rated voltage of the first battery, the power conversion device comprising:
   a charging circuit including:
      a power conversion circuit configured to convert AC power input from an AC power supply into DC power, and
      a second voltage converter configured to convert a conversion voltage output from the power conversion circuit and output the converted voltage to the first battery;
   a first voltage converter configured to step down a power supply voltage of the first battery and output the stepped-down voltage to the second battery;
   an interrupting unit configured to be capable of interrupting a supply of the DC power to the first voltage converter during charging of the first battery by the charging circuit; and
   a third voltage converter configured to:
      have a lower rated output current than the first voltage converter;
      be connected between a portion of the power conversion circuit and a portion of the first voltage converter, the portion of the power conversion circuit being connected to the second voltage converter, the portion of the first voltage converter being connected to the second battery;
      step down the conversion voltage output from the power conversion circuit and output the stepped-down voltage to the second battery; and
      include:
         a primary-side circuit connected to the power conversion circuit,
         a secondary-side circuit connected to the first voltage converter, and
         an isolation transformer connecting the primary-side circuit to the secondary-side circuit, wherein
   the first voltage converter and the third voltage converter are connected to the second battery via a first filter circuit and a second filter circuit, the first filter circuit and the second filter circuit being shared by the first voltage converter and the third voltage converter, and the second filter circuit being provided at a position closer to the second battery than is the first filter circuit and having a higher cutoff frequency than the first filter circuit, and
   the third voltage converter is connected to the second battery via the first filter circuit and the second filter circuit, the first filter circuit and the second filter circuit being provided in the first voltage converter.

2. The power conversion device according to claim 1, wherein
   the first voltage converter includes:
      a primary-side circuit connected to the first battery,
      the secondary-side circuit of the third voltage converter serving as a secondary-side circuit of the first voltage converter, the secondary-side circuit of the first voltage converter being connected to the second battery, and
      an isolation transformer connecting the primary-side circuit to the secondary-side circuit.

3. The power conversion device according to claim 1, wherein
the interrupting unit includes:
a charging-side connector connecting the charging circuit to the first battery, and
a voltage-conversion-side connector provided separately from the charging-side connector and connecting the first voltage converter to the first battery.

4. The power conversion device according to claim 1, further comprising:
a charging path connecting the charging circuit to the first battery; and
a voltage conversion path connecting the first voltage converter to the first battery, wherein
the interrupting unit includes:
a switch unit provided at a portion of the voltage conversion path closer to the first voltage converter than is a connection point between the charging path and the voltage conversion path.

5. The power conversion device according to claim 4, wherein
the switch unit is a first switch unit, and
the interrupting unit includes a second switch unit provided at a portion of the charging path closer to the charging circuit than the connection point is.

6. The power conversion device according to claim 1, wherein
the second voltage converter is configured to receive the DC power from the power conversion circuit and to convert the conversion voltage output from the power conversion circuit and output the converted voltage to the first battery.

7. The power conversion device according to claim 1, wherein
the third voltage converter is connected to at least one connection point located at a portion of wiring between the power conversion circuit and the second voltage converter.

8. A power conversion device that is applicable to a power supply system, the power supply system including a first battery and a second battery having a lower rated voltage than a rated voltage of the first battery, the power conversion device comprising:
a charging circuit including:
a power conversion circuit configured to convert AC power input from an AC power supply into DC power, and
a second voltage converter configured to convert a conversion voltage output from the power conversion circuit and output the converted voltage to the first battery;
a first voltage converter configured to:
step down a power supply voltage of the first battery and output the stepped-down voltage to the second battery, and
include:
a primary-side circuit connected to the first battery,
a secondary-side circuit connected to the second battery, and
an isolation transformer connecting the primary-side circuit to the secondary-side circuit;
an interrupting unit configured to be capable of interrupting a supply of the DC power to the first voltage converter during charging of the first battery by the charging circuit; and
a third voltage converter configured to:
be connected between a portion of the power conversion circuit and a portion of the first voltage converter, the portion of the power conversion circuit being connected to the second voltage converter, the portion of the first voltage converter being connected to the second battery,
step down the conversion voltage output from the power conversion circuit and output the stepped-down voltage to the second battery, and
include:
a primary-side circuit connected to the power conversion circuit,
the secondary-side circuit of the first voltage converter serving as a secondary-side circuit of the third voltage converter, the secondary-side circuit of the third voltage converter being connected to the first voltage converter, and
an isolation transformer connecting the primary-side circuit to the secondary-side circuit, wherein
the first voltage converter and the third voltage converter are connected to the second battery via a first filter circuit and a second filter circuit, the first filter circuit and the second filter circuit being shared by the first voltage converter and the third voltage converter, and the second filter circuit being provided at a position closer to the second battery than is the first filter circuit and having a higher cutoff frequency than the first filter circuit.

9. The power conversion device according to claim 8, wherein
the interrupting unit includes:
a charging-side connector connecting the charging circuit to the first battery, and
a voltage-conversion-side connector provided separately from the charging-side connector and connecting the first voltage converter to the first battery.

10. The power conversion device according to claim 8, further comprising:
a charging path connecting the charging circuit to the first battery; and
a voltage conversion path connecting the first voltage converter to the first battery, wherein
the interrupting unit includes:
a switch unit provided at a portion of the voltage conversion path closer to the first voltage converter than is a connection point between the charging path and the voltage conversion path.

11. The power conversion device according to claim 10, wherein
the switch unit is a first switch unit, and
the interrupting unit includes a second switch unit provided at a portion of the charging path closer to the charging circuit than the connection point is.

* * * * *